United States Patent
Suehiro et al.

(10) Patent No.: US 11,979,335 B2
(45) Date of Patent: May 7, 2024

(54) NETWORK CONTROLLER

(71) Applicant: MITSUBISHI ELECTRIC CORPORATION, Tokyo (JP)

(72) Inventors: Takeshi Suehiro, Tokyo (JP); Yukio Hirano, Tokyo (JP); Kenichi Nakura, Tokyo (JP); Akiko Iwasaki, Tokyo (JP); Hiromu Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 17/469,252

(22) Filed: Sep. 8, 2021

(65) Prior Publication Data
US 2021/0409343 A1 Dec. 30, 2021

Related U.S. Application Data

(63) Continuation of application No. PCT/JP2019/017975, filed on Apr. 26, 2019.

(51) Int. Cl.
*H04L 47/76* (2022.01)
*H04W 24/02* (2009.01)
*H04W 88/12* (2009.01)

(52) U.S. Cl.
CPC .......... *H04L 47/76* (2013.01); *H04W 24/02* (2013.01); *H04W 88/12* (2013.01)

(58) Field of Classification Search
None
See application file for complete search history.

(56) References Cited

U.S. PATENT DOCUMENTS

| 2018/0027062 | A1* | 1/2018 | Bernat | H03M 7/4056 |
| | | | | 709/224 |
| 2018/0359337 | A1* | 12/2018 | Kodaypak | H04L 41/0897 |
| 2019/0230725 | A1* | 7/2019 | Lou | H04W 80/10 |
| 2019/0261185 | A1* | 8/2019 | Velev | H04W 48/18 |
| 2020/0244591 | A1* | 7/2020 | Meng | H04L 47/781 |

FOREIGN PATENT DOCUMENTS

| JP | 2014-45390 A | 3/2014 |
| JP | 2016-86225 A | 5/2016 |
| JP | 2017-11467 A | 1/2017 |
| JP | 6279436 B2 | 2/2018 |

* cited by examiner

*Primary Examiner* — Srinivasa R Reddivalam
(74) *Attorney, Agent, or Firm* — BIRCH, STEWART, KOLASCH & BIRCH, LLP

(57) ABSTRACT

A network controller is configured to perform, to a new slice request, resource allocation from a resource of unallocated resource information managed by a resource information management unit, and to reallocate the resource to an existing slice request so that an unallocated resource increases based on unallocated resource information managed by the resource information management unit.

16 Claims, 10 Drawing Sheets

FIG.4

| DEVICE | PORT | BANDWIDTH (Gbps) | DEVICE LATENCY (μs) | FAILURE RATE |
|---|---|---|---|---|
| SERVER #1 | 1 | 10 | 1000 | 0.002 |
| | 2 | 10 | | |
| SERVER #2 | 1 | 10 | 1000 | 0.002 |
| | 2 | 10 | | |
| ROUTER #1 | 1 | 10 | 5 | 0.001 |
| | 2 | 10 | | |
| | 3 | 1 | | |
| | 4 | 2 | | |
| ROUTER #2 | 1 | 1 | 5 | 0.001 |
| | 2 | 1 | | |
| ROUTER #3 | 1 | 2 | 5 | 0.001 |
| | 2 | 2 | | |
| MASTER STATION #1 | 1 | 1 | 100 | 0.002 |
| | 2 | 2 | | |
| | 3 | 10 | | |
| SWITCH #1 | 1 | 10 | 1 | 0.001 |
| | 2 | 10 | | |
| | 3 | 10 | | |
| SWITCH #2 | 1 | 10 | 1 | 0.001 |
| | 2 | 10 | | |
| SWITCH #3 | 1 | 10 | 1 | 0.001 |
| | 2 | 10 | | |
| SLAVE STATION #1 | 1 | 10 | 10 | 0.002 |
| | 2 | 5 | | |
| SLAVE STATION #2 | 1 | 10 | 10 | 0.002 |
| | 2 | 5 | | |

| LINK | START POINT NODE | ENDPOINT NODE | BANDWIDTH (Gbps) | TRANSMISSION LATENCY (μs) |
|---|---|---|---|---|
| L1 | SERVER #1-2 | ROUTER #1-1 | 10 | 0.1 |
| L2 | SERVER #2-2 | ROUTER #1-2 | 10 | 0.1 |
| L3 | ROUTER #1-3 | ROUTER #2-1 | 1 | 0.1 |
| L4 | ROUTER #1-4 | ROUTER #3-1 | 2 | 0.1 |
| L5 | ROUTER #2-2 | MASTER STATION#1-1 | 1 | 0.1 |
| L6 | ROUTER #3-2 | MASTER STATION#1-2 | 2 | 0.1 |
| L7 | MASTER STATION#1-3 | SWITCH #1-1 | 10 | 0.1 |
| L8 | SWITCH #1-2 | SWITCH #2-1 | 10 | 0.1 |
| L9 | SWITCH #1-3 | SWITCH #3-1 | 10 | 0.1 |
| L10 | SWITCH #2-2 | SLAVE STATION #1-1 | 10 | 0.1 |
| L11 | SWITCH #3-2 | SLAVE STATION #1-2 | 10 | 0.1 |

| SLICE REQUEST | HIGHER-LEVEL HOST | LOWER-LEVEL HOST | REQUESTED BANDWIDTH (Gbps) |
|---|---|---|---|
| R1 | SERVER #1 | SLAVE STATION #1 | 1 |
| R2 | SERVER #2 | SLAVE STATION #2 | 1.5 |

| DEVICE | PORT | BANDWIDTH (Gbps) | ALLOCATED BANDWIDTH (Gbps) | UNALLOCATED BANDWIDTH (Gbps) |
|---|---|---|---|---|
| SERVER #1 | 1 | 10 | 0 | 10 |
| | 2 | 10 | 10 | 0 |
| SERVER #2 | 1 | 10 | 0 | 10 |
| | 2 | 10 | 0 | 10 |
| ROUTER #1 | 1 | 10 | 10 | 0 |
| | 2 | 10 | 0 | 10 |
| | 3 | 1 | 1 | 0 |
| | 4 | 2 | 2 | 0 |
| ROUTER #2 | 1 | 1 | 1 | 0 |
| | 2 | 1 | 1 | 0 |
| ROUTER #3 | 1 | 2 | 2 | 0 |
| | 2 | 2 | 2 | 0 |
| MASTER STATION #1 | 1 | 1 | 1 | 0 |
| | 2 | 2 | 2 | 0 |
| | 3 | 10 | 10 | 0 |
| SWITCH #1 | 1 | 10 | 10 | 0 |
| | 2 | 10 | 10 | 0 |
| | 3 | 10 | 0 | 10 |
| SWITCH #2 | 1 | 10 | 10 | 0 |
| | 2 | 10 | 10 | 0 |
| SWITCH #3 | 1 | 10 | 0 | 10 |
| | 2 | 10 | 0 | 10 |
| SLAVE STATION #1 | 1 | 10 | 10 | 0 |
| | 2 | 5 | 0 | 5 |
| SLAVE STATION #2 | 1 | 10 | 0 | 10 |
| | 2 | 5 | 0 | 5 |

FIG. 8

| LINK | START POINT NODE | ENDPOINT NODE | BANDWIDTH (Gbps) | ALLOCATED BANDWIDTH (Gbps) | UNALLOCATED BANDWIDTH (Gbps) |
|---|---|---|---|---|---|
| L1 | SERVER #1-2 | ROUTER #1-1 | 10 | 10 | 0 |
| L2 | SERVER #2-2 | ROUTER #1-2 | 10 | 0 | 10 |
| L3 | ROUTER #1-3 | ROUTER #2-1 | 1 | 1 | 0 |
| L4 | ROUTER #1-4 | ROUTER #3-1 | 2 | 2 | 0 |
| L5 | ROUTER #2-2 | MASTER STATION#1-1 | 1 | 1 | 0 |
| L6 | ROUTER #3-2 | MASTER STATION#1-2 | 2 | 2 | 0 |
| L7 | MASTER STATION#1-3 | SWITCH #1-1 | 10 | 10 | 0 |
| L8 | SWITCH #1-2 | SWITCH #2-1 | 10 | 10 | 0 |
| L9 | SWITCH #1-3 | SWITCH #3-1 | 10 | 0 | 10 |
| L10 | SWITCH #2-2 | SLAVE STATION #1-1 | 10 | 10 | 0 |
| L11 | SWITCH #3-2 | SLAVE STATION #1-2 | 10 | 0 | 10 |

FIG. 9

| DEVICE | PORT | BANDWIDTH (Gbps) | ALLOCATED BANDWIDTH (Gbps) | UNALLOCATED BANDWIDTH (Gbps) |
|---|---|---|---|---|
| SERVER #1 | 1 | 10 | 0 | 10 |
| | 2 | 10 | 10 | 0 |
| SERVER #2 | 1 | 10 | 0 | 10 |
| | 2 | 10 | 0 | 10 |
| ROUTER #1 | 1 | 10 | 10 | 0 |
| | 2 | 10 | 0 | 10 |
| | 3 | 1 | 0 | 1 |
| | 4 | 2 | 2 | 0 |
| ROUTER #2 | 1 | 1 | 0 | 1 |
| | 2 | 1 | 0 | 1 |
| ROUTER #3 | 1 | 2 | 2 | 0 |
| | 2 | 2 | 2 | 0 |
| MASTER STATION #1 | 1 | 1 | 0 | 1 |
| | 2 | 2 | 2 | 0 |
| | 3 | 10 | 10 | 0 |
| SWITCH #1 | 1 | 10 | 10 | 0 |
| | 2 | 10 | 10 | 0 |
| | 3 | 10 | 0 | 10 |
| SWITCH #2 | 1 | 10 | 10 | 0 |
| | 2 | 10 | 10 | 0 |
| SWITCH #3 | 1 | 10 | 0 | 10 |
| | 2 | 10 | 0 | 10 |
| SLAVE STATION #1 | 1 | 10 | 10 | 0 |
| | 2 | 5 | 0 | 5 |
| SLAVE STATION #2 | 1 | 10 | 0 | 10 |
| | 2 | 5 | 0 | 5 |

FIG. 10

| LINK | START POINT NODE | ENDPOINT NODE | BANDWIDTH (Gbps) | ALLOCATED BANDWIDTH (Gbps) | UNALLOCATED BANDWIDTH (Gbps) |
|---|---|---|---|---|---|
| L1 | SERVER #1-2 | ROUTER #1-1 | 10 | 10 | 0 |
| L2 | SERVER #2-2 | ROUTER #1-2 | 10 | 0 | 10 |
| L3 | ROUTER #1-3 | ROUTER #2-1 | 1 | 0 | 1 |
| L4 | ROUTER #1-4 | ROUTER #3-1 | 2 | 2 | 0 |
| L5 | ROUTER #2-2 | MASTER STATION#1-1 | 1 | 0 | 1 |
| L6 | ROUTER #3-2 | MASTER STATION#1-2 | 2 | 2 | 0 |
| L7 | MASTER STATION#1-3 | SWITCH #1-1 | 10 | 10 | 0 |
| L8 | SWITCH #1-2 | SWITCH #2-1 | 10 | 10 | 0 |
| L9 | SWITCH #1-3 | SWITCH #3-1 | 10 | 0 | 10 |
| L10 | SWITCH #2-2 | SLAVE STATION #1-1 | 10 | 10 | 0 |
| L11 | SWITCH #3-2 | SLAVE STATION #1-2 | 10 | 0 | 10 |

FIG. 11

| DEVICE | PORT | BANDWIDTH (Gbps) | ALLOCATED BANDWIDTH (Gbps) | UNALLOCATED BANDWIDTH (Gbps) |
|---|---|---|---|---|
| SERVER #1 | 1 | 10 | 0 | 10 |
| SERVER #1 | 2 | 10 | 1 | 9 |
| SERVER #2 | 1 | 10 | 0 | 10 |
| SERVER #2 | 2 | 10 | 0 | 10 |
| ROUTER #1 | 1 | 10 | 1 | 9 |
| ROUTER #1 | 2 | 10 | 0 | 10 |
| ROUTER #1 | 3 | 1 | 0 | 1 |
| ROUTER #1 | 4 | 2 | 1 | 1 |
| ROUTER #2 | 1 | 1 | 0 | 1 |
| ROUTER #2 | 2 | 1 | 0 | 1 |
| ROUTER #3 | 1 | 2 | 1 | 1 |
| ROUTER #3 | 2 | 2 | 1 | 1 |
| MASTER STATION #1 | 1 | 1 | 0 | 1 |
| MASTER STATION #1 | 2 | 2 | 1 | 1 |
| MASTER STATION #1 | 3 | 10 | 1 | 9 |
| SWITCH #1 | 1 | 10 | 1 | 9 |
| SWITCH #1 | 2 | 10 | 1 | 9 |
| SWITCH #1 | 3 | 10 | 0 | 10 |
| SWITCH #2 | 1 | 10 | 1 | 9 |
| SWITCH #2 | 2 | 10 | 1 | 9 |
| SWITCH #3 | 1 | 10 | 0 | 10 |
| SWITCH #3 | 2 | 10 | 0 | 10 |
| SLAVE STATION #1 | 1 | 10 | 1 | 9 |
| SLAVE STATION #1 | 2 | 5 | 0 | 5 |
| SLAVE STATION #2 | 1 | 10 | 0 | 10 |
| SLAVE STATION #2 | 2 | 5 | 0 | 5 |

FIG. 12

| LINK | START POINT NODE | ENDPOINT NODE | BANDWIDTH (Gbps) | ALLOCATED BANDWIDTH (Gbps) | UNALLOCATED BANDWIDTH (Gbps) |
|---|---|---|---|---|---|
| L1 | SERVER #1-2 | ROUTER #1-1 | 10 | 1 | 9 |
| L2 | SERVER #2-2 | ROUTER #1-2 | 10 | 0 | 10 |
| L3 | ROUTER #1-3 | ROUTER #2-1 | 1 | 0 | 1 |
| L4 | ROUTER #1-4 | ROUTER #3-1 | 2 | 1 | 1 |
| L5 | ROUTER #2-2 | MASTER STATION#1-1 | 1 | 0 | 1 |
| L6 | ROUTER #3-2 | MASTER STATION#1-2 | 2 | 1 | 1 |
| L7 | MASTER STATION#1-3 | SWITCH #1-1 | 10 | 1 | 9 |
| L8 | SWITCH #1-2 | SWITCH #2-1 | 10 | 1 | 9 |
| L9 | SWITCH #1-3 | SWITCH #3-1 | 10 | 0 | 10 |
| L10 | SWITCH #2-2 | SLAVE STATION #1-1 | 10 | 1 | 9 |
| L11 | SWITCH #3-2 | SLAVE STATION #1-2 | 10 | 0 | 10 |

FIG. 13

| DEVICE | PORT | BANDWIDTH (Gbps) | ALLOCATED BANDWIDTH (Gbps) | UNALLOCATED BANDWIDTH (Gbps) |
|---|---|---|---|---|
| SERVER #1 | 1 | 10 | 0 | 10 |
| | 2 | 10 | 1 | 9 |
| SERVER #2 | 1 | 10 | 0 | 10 |
| | 2 | 10 | 0 | 10 |
| ROUTER #1 | 1 | 10 | 1 | 9 |
| | 2 | 10 | 0 | 10 |
| | 3 | 1 | 1 | 0 |
| | 4 | 2 | 0 | 2 |
| ROUTER #2 | 1 | 1 | 1 | 0 |
| | 2 | 1 | 1 | 0 |
| ROUTER #3 | 1 | 2 | 0 | 2 |
| | 2 | 2 | 0 | 2 |
| MASTER STATION #1 | 1 | 1 | 1 | 0 |
| | 2 | 2 | 0 | 2 |
| | 3 | 10 | 1 | 9 |
| SWITCH #1 | 1 | 10 | 1 | 9 |
| | 2 | 10 | 1 | 9 |
| | 3 | 10 | 0 | 10 |
| SWITCH #2 | 1 | 10 | 1 | 9 |
| | 2 | 10 | 1 | 9 |
| SWITCH #3 | 1 | 10 | 0 | 10 |
| | 2 | 10 | 0 | 10 |
| SLAVE STATION #1 | 1 | 10 | 1 | 9 |
| | 2 | 5 | 0 | 5 |
| SLAVE STATION #2 | 1 | 10 | 0 | 10 |
| | 2 | 5 | 0 | 5 |

FIG. 14

| LINK | START POINT NODE | ENDPOINT NODE | BANDWIDTH (Gbps) | ALLOCATED BANDWIDTH (Gbps) | UNALLOCATED BANDWIDTH (Gbps) |
|---|---|---|---|---|---|
| L1 | SERVER #1-2 | ROUTER #1-1 | 10 | 1 | 9 |
| L2 | SERVER #2-2 | ROUTER #1-2 | 10 | 0 | 10 |
| L3 | ROUTER #1-3 | ROUTER #2-1 | 1 | 1 | 0 |
| L4 | ROUTER #1-4 | ROUTER #3-1 | 2 | 0 | 2 |
| L5 | ROUTER #2-2 | MASTER STATION#1-1 | 1 | 1 | 0 |
| L6 | ROUTER #3-2 | MASTER STATION#1-2 | 2 | 0 | 2 |
| L7 | MASTER STATION#1-3 | SWITCH #1-1 | 10 | 1 | 9 |
| L8 | SWITCH #1-2 | SWITCH #2-1 | 10 | 1 | 9 |
| L9 | SWITCH #1-3 | SWITCH #3-1 | 10 | 0 | 10 |
| L10 | SWITCH #2-2 | SLAVE STATION #1-1 | 10 | 1 | 9 |
| L11 | SWITCH #3-2 | SLAVE STATION #1-2 | 10 | 0 | 10 |

NETWORK CONTROLLER

CROSS REFERENCE TO RELATED APPLICATIONS

This application is a Continuation of PCT International Application PCT/JP2019/017975, filed on Apr. 26, 2019, which is hereby expressly incorporated by reference into the present application.

TECHNICAL FIELD

The present invention relates to a network controller configured to allocate a resource possessed by devices on a network.

BACKGROUND ART

In recent years, several communication services having different communication requirements have existed. Examples of such communication services include mobile broadband services requiring high data rates, mission-critical services requiring high reliability and low latency, and "Massive Internet of Things" services requiring high-density device storage.

Currently, consideration is being given to allocating those communication services to slices generated on shared communication network infrastructure.

A slice is a logically divided virtual network. Slices are managed by a controller. The controller is configured to secure for each device the resource required for a requested communication service from the available resource of each device existing on the communication network, and to allocate the resource to the slices.

Further, in order to generate as many slices as possible on shared communication network infrastructure, there has been considered a technology of efficiently allocating the resource possessed by each device to the slices (refer to, for example, Patent Literature 1).

Further, in order to rapidly respond to a request for a communication service or to a request to change the communication service, it is required to rapidly allocate the resource to the slices or to rapidly change the resource allocated to the slices.

"New allocation" of rapidly allocating the resource to the slices and "allocation change" of rapidly changing the resource allocated to the slices are hereinafter collectively referred to simply as "allocation".

In Patent Literature 1, a controller is configured to acquire topology information on a physical network, information on an existing virtual network, and information on an allocation-requested virtual network to be newly allocated to the physical network. Based on those pieces of acquired information, the controller selects physical node candidates to which each virtual node of the allocation-requested virtual network can be allocated. Further, the controller virtually adds a pseudo node corresponding to each virtual node of the allocation-requested virtual network to the physical network topology. Then, the controller establishes a pseudo link between the physical node candidates and the pseudo nodes to extend the physical network. On the extended physical network, the controller calculates virtual network allocation that minimizes the sum of the costs of slicing as the solution of an integer programming model.

CITATION LIST

Patent Literature

[PTL 1] JP 6279436 B2

SUMMARY OF INVENTION

Technical Problem

However, in Patent Literature 1, the integer programming method is used, and therefore there is an increased processing load on the controller as the network scale increases or the types of resources to be considered increase. As a result, there is a problem in that rapid resource allocation becomes difficult.

The present invention has been made to solve the above-mentioned problem, and an object of the present invention is to provide a network controller capable of rapidly allocating a resource to a slice request.

Solution to Problem

According to one embodiment of the present invention, there is provided a network controller including: a network information acquisition unit configured to acquire resource information indicating a resource possessed by each of devices on a network and connection information indicating connections between the devices on the network; a slice management unit configured to receive a slice request requesting resource allocation, manage the received slice request as a new slice request, and to manage an existing slice request as an existing slice request; a resource information management unit configured to manage the resource information acquired by the network information acquisition unit, and to manage unallocated resource information indicating an unallocated resource determined by excluding an allocated resource from the resource of the resource information; a resource allocation unit configured to determine, based on the resource information and the unallocated resource information managed by the resource information management unit, a resource to be allocated to the new slice request and the existing slice request managed by the slice management unit; and a network control unit configured to set each of the devices on the network based on the resource allocation determined by the resource allocation unit, the resource allocation unit including: a new request allocation unit configured to perform, to the new slice request, resource allocation from a resource of the unallocated resource information managed by the resource information management unit; and an existing request reallocation unit configured to reallocate the resource to the existing slice request so that the unallocated resource increases based on the unallocated resource information managed by the resource information management unit.

Advantageous Effects of Invention

According to the network controller of the present invention, it is possible to rapidly allocate the resource to the slice request.

BRIEF DESCRIPTION OF DRAWINGS

FIG. 4 is a table for showing an example of resource information on each component of the network controller included in the communication system in the first embodiment of the present invention.

FIG. 5 is a table for showing an example of connection information on each component of the network controller included in the communication system in the first embodiment of the present invention.

FIG. 6 is a table for showing an example of a slice request received by the network controller from an orchestrator included in the communication system in the first embodiment of the present invention.

FIG. 7 is a table for showing an example of a bandwidth resource allocated to a slice request and an unallocated bandwidth resource in the network controller included in the communication system in the first embodiment of the present invention.

FIG. 8 is a table for showing an example of a bandwidth resource allocated to a slice request and an unallocated bandwidth resource in the network controller included in the communication system in the first embodiment of the present invention.

FIG. 9 is a table for showing an example of a bandwidth resource allocated to a slice request and an unallocated bandwidth resource in the network controller included in the communication system in the first embodiment of the present invention.

FIG. 10 is a table for showing an example of a bandwidth resource allocated to a slice request and an unallocated bandwidth resource in the network controller included in the communication system in the first embodiment of the present invention.

FIG. 11 is a table for showing an example of a bandwidth resource allocated to a slice request and an unallocated bandwidth resource in the network controller included in the communication system in the first embodiment of the present invention.

FIG. 12 is a table for showing an example of an allocated bandwidth allocated to a slice request and an unallocated bandwidth in the network controller included in the communication system in the first embodiment of the present invention.

FIG. 13 is a table for showing an example of a reallocated allocated bandwidth and an unallocated bandwidth in the network controller included in the communication system in the first embodiment of the present invention.

FIG. 14 is a table for showing an example of a reallocated allocated bandwidth and an unallocated bandwidth in the network controller included in the communication system in the first embodiment of the present invention.

DESCRIPTION OF EMBODIMENTS

Now, details of embodiments of the present invention are described with reference to the accompanying drawings. It should be noted, however, that the embodiments described below are merely examples, and the present invention is not limited to those embodiments.

First Embodiment

Figure 1:
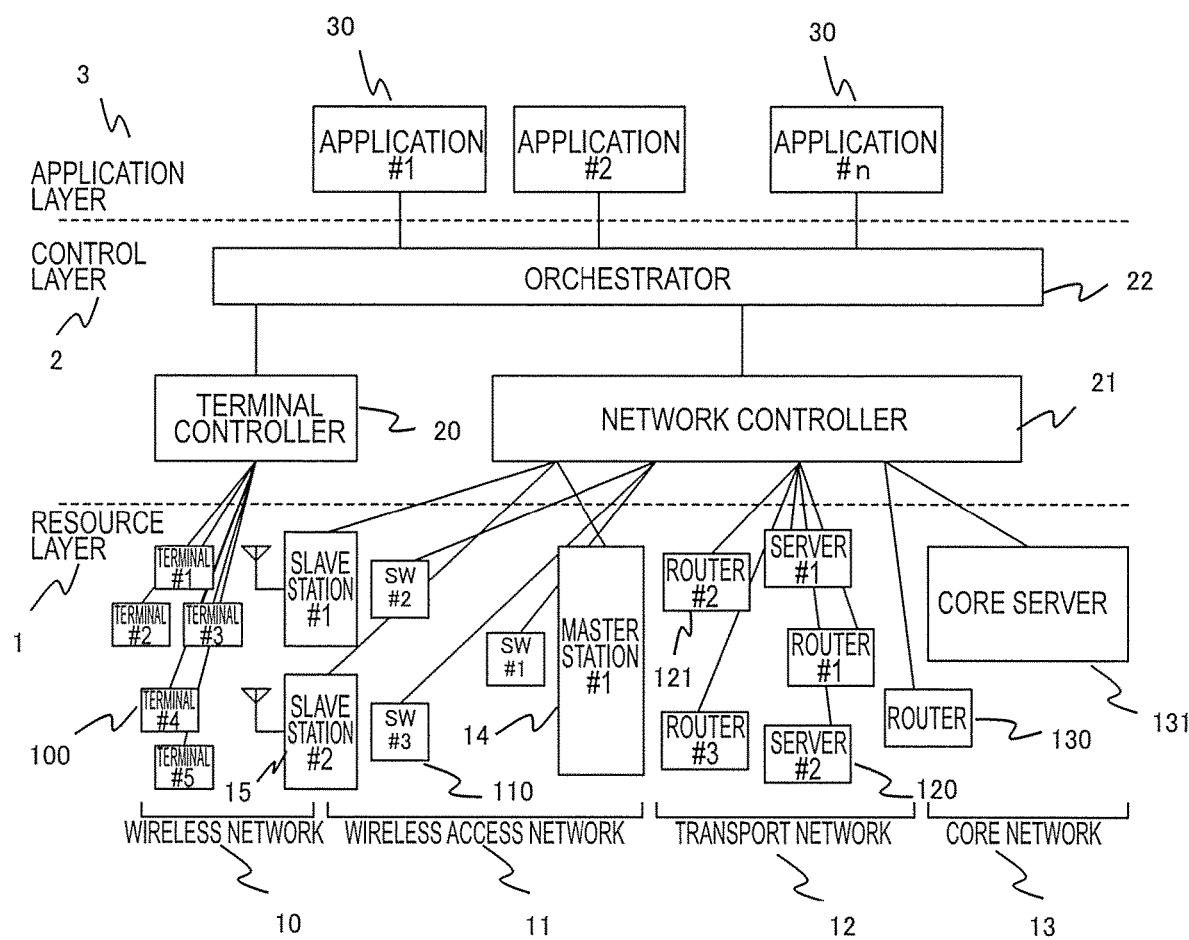
FIG. 1 is a diagram for illustrating an example of a communication system in a first embodiment of the present invention.

FIG. 1 is a diagram for illustrating an example of a communication system in a first embodiment of the present invention. As illustrated in FIG. 1, the communication system includes a resource layer 1, a control layer 2, and an application layer 3.

The resource layer 1 includes various physical or virtual devices. The resource layer 1 includes a wireless network 10, a wireless access network 11, a transport network 12, and a core network 13.

In the example of FIG. 1, a plurality of terminals 100 are included as devices applied to the wireless network 10. Each terminal 100 is distinguished through use of the symbol "#" to display the terminals as "terminal #1", "terminal #2", . . . , "terminal #5". Not only the terminals but also other components are hereinafter displayed with the symbol "#" to distinguish the components from each other.

Further, a plurality of switches 110 are included as devices applied to the wireless access network 11. Each switch 110 is distinguished through use of the symbol "#" to display the switches as "SW #1" or "switch #1", "SW #2" or "switch #2", . . . , "SW #5" or "switch #5".

As devices applied to the transport network 12, a plurality of servers 120 and a plurality of routers 121 are included. The servers 120 and the routers 121 are also individually distinguished through use of the symbol "#".

As devices applied to the core network 13, a router 130 and a core server 131 are included.

The control layer 2 includes a plurality of controllers configured to manage and control each of the various devices of each domain, and an orchestrator 22 configured to manage and control the plurality of controllers. In the example of FIG. 1, a terminal controller 20 and a network controller 21 are included as the plurality of controllers.

The network controller 21 is configured to manage and control a master station 14, a plurality of slave stations 15, the plurality of switches 110, the plurality of servers 120, the plurality of routers 121, the router 130, and the core server 131.

The terminal controller 20 is configured to manage and control the plurality of terminals 100.

The application layer 3 includes one or more applications 30. In the example of FIG. 1, "n" applications are included. Here, "n" is an integer of one or more.

In FIG. 1, there are illustrated logical connections between the resource layer 1 and the control layer 2. The physical network connecting the resource layer 1 and the control layer 2 may be a dedicated network or a network sharing user data.

Figure 2:
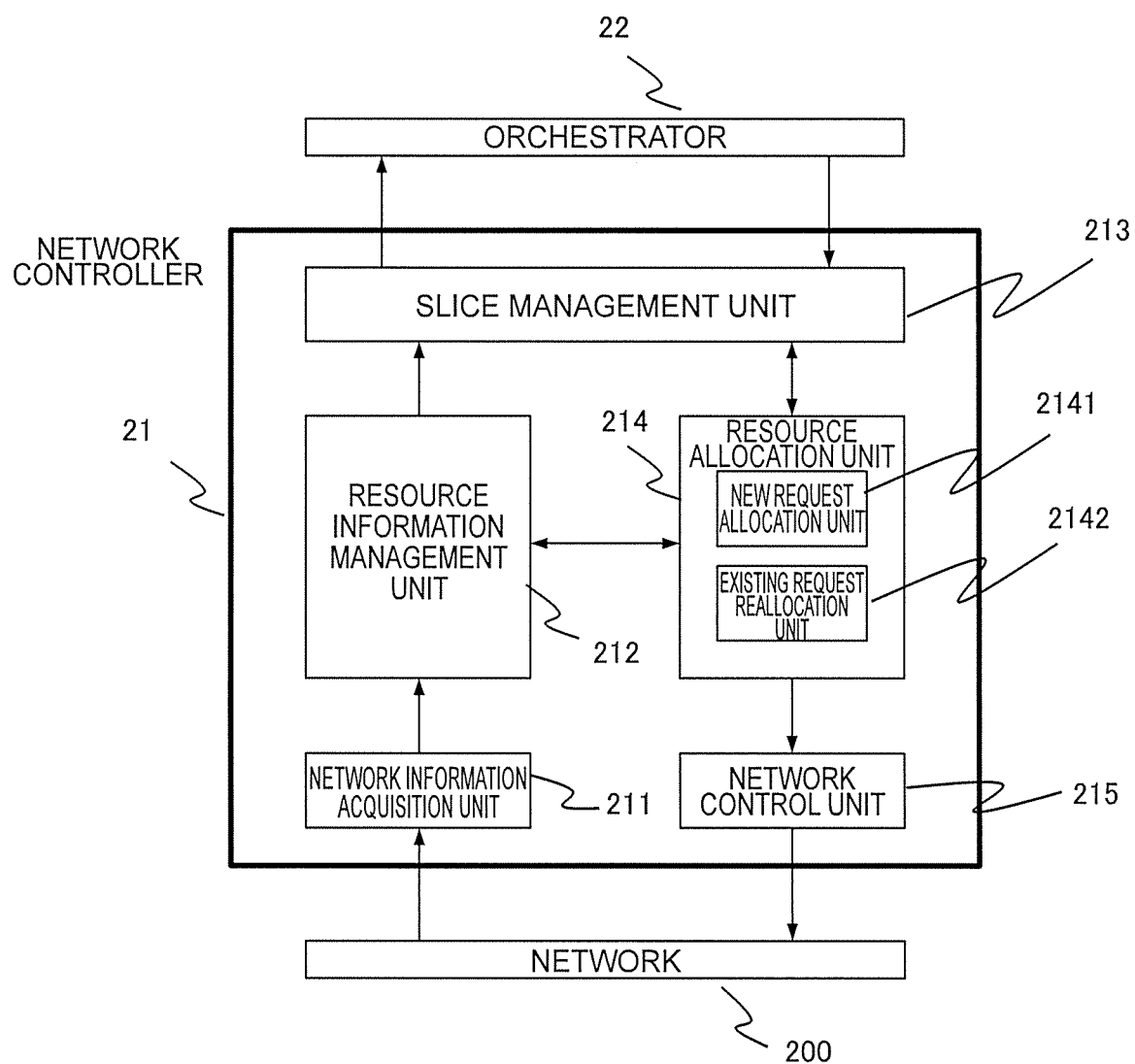
FIG. 2 is a block diagram for illustrating a configuration of a network controller included in the communication system in the first embodiment of the present invention.

FIG. 2 is a block diagram for illustrating a configuration of the network controller 21 according to the first embodiment of the present invention. As illustrated in FIG. 2, the network controller 21 includes a network information acquisition unit 211, a resource information management unit 212, a slice management unit 213, a resource allocation unit 214, and a network control unit 215. The resource allocation unit 214 includes a new request allocation unit 2141 and an existing request reallocation unit 2142. In FIG. 2, the network 200 includes the wireless network 10, the wireless access network 11, the transport network 12, and the core network 13 illustrated in FIG. 1.

Figure 3:
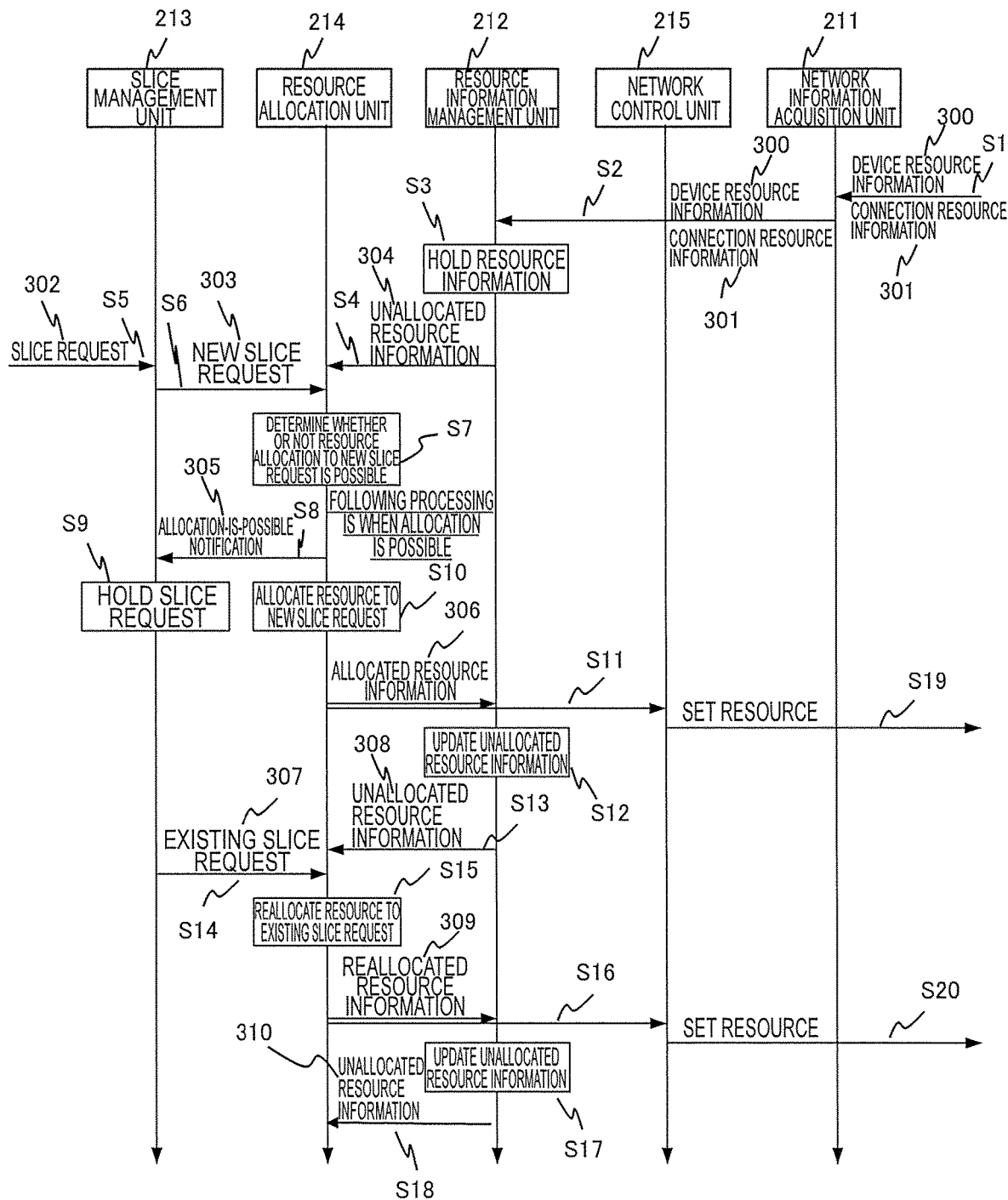
FIG. 3 is a sequence diagram for illustrating operation of the network controller included in the communication system in the first embodiment of the present invention.

FIG. 3 is a sequence diagram for illustrating operation of the network controller 21 according to the first embodiment. Operation of each component of the network controller 21 is described below with reference to FIG. 3.

Acquisition of Network Information

In Step S1, when the network controller 21 and each device of the resource layer 1 are started up, the network information acquisition unit 211 acquires device resource information 300 summarizing the resource information on each device on the network 200 and connection resource information 301 between each device. In Step S2, the network information acquisition unit 211 transmits the acquired device resource information 300 on each device and the connection resource information 301 between each device to the resource information management unit 212.

FIG. 4 and FIG. 5 are tables for showing examples of the device resource information 300 and the connection resource information 301 on the network 200 acquired by the network information acquisition unit 211.

In FIG. 4, there is shown an example of the device resource information 300 on each device on the network 200. In FIG. 4, the device resource information 300 includes, for each device, information on the ports possessed by the device, the bandwidth of each port, a device latency, and a failure rate. For example, the server #1 includes two ports 1 and 2, and the bandwidth of both the ports 1 and 2 is 10 Gbps. The device latency of the server #1 is 1,000 microseconds, and the failure rate is 0.002. The device latency indicates a transfer latency between ports. The device latency may be managed for each device, or may be managed individually for each port of the device.

In FIG. 5, there is shown an example of the connection resource information 301 between each device. The connection resource information 301 includes, for each link, information on a start point node of a link, an endpoint node of the link, the bandwidth of the link, and a transmission latency. The information on the start point node of the link and the endpoint node of the link is information indicating a connection relationship between the ports of the device. In FIG. 5, "server #1-2" indicates "port 2" of "server #1". Similarly, for the other descriptions as well, the number following the symbol "-" indicates the port number. The same applies to each of the drawings described later. For example, a link L1 represents a connection between a port 2 of the server #1 and a port 1 of a router #1, and has a bandwidth of 10 Gbps and a transmission latency of 0.1 microseconds. The connection information between each device may be individually managed in accordance with a communication direction.

Examples of specific methods of acquiring the device resource information 300 of FIG. 4 and the connection resource information 301 of FIG. 5 by the network information acquisition unit 211 include transmitting an inquiry to each device, using a route search protocol, and reading information possessed by a network administrator, and any of those methods can be used.

The timing of acquiring the device resource information 300 and the connection resource information 301 by the network information acquisition unit 211 is not limited to at the time of start up, and may be performed at a fixed cycle. The device resource information 300 and the connection resource information 301 timing may be acquired based on an instruction from the orchestrator 22 or the network administrator, or based on a resource change notification from the resource layer 1.

In Step S3, the resource information management unit 212 holds the device resource information 300 on each device and the connection resource information 301 between each device in a memory. In Step S4, the resource information management unit 212 transmits the device resource information 300 on each device and the connection resource information 301 between each device to the resource allocation unit 214 as unallocated resource information 304.

Slice Management

In Step S5, the slice management unit 213 receives a slice request 302 from the orchestrator 22, and then in Step S6, the slice management unit 213 transmits a new slice request 303 to the resource allocation unit 214. In Step S7, the resource allocation unit 214 determines whether or not a resource allocation satisfying the new slice request 303 is possible. When it is determined that a resource allocation satisfying the new slice request 303 is possible, in Step S8, the resource allocation unit 214 transmits an allocation-is-possible notification 305 to the slice management unit 213. In Step S9, the slice management unit 213 receives the allocation-is-possible notification 305, and in Step S9, holds the new slice request 303 as an existing slice request.

FIG. 6 is a table for showing an example of the slice request 302 received from the orchestrator 22. In FIG. 6, a higher-level host is a device serving as a higher-level endpoint and a lower-level host is a device serving as a lower-level endpoint of a network constructing a slice, which is a virtual network. In the example of a slice request R1, the higher-level endpoint is the server #1, and the lower-level endpoint is the slave station #1.

Resource Information Management and Resource Allocation

As described above, the resource information management unit 212 is configured to manage the device resource information 300 on each device and the connection resource information 301 between each device received from the network information acquisition unit 211. Further, of the resource, the resource information management unit 212 manages the unallocated resource information 304 indicating the unallocated resource, which is determined by excluding the allocated resource allocated to the slice request 302 by the resource allocation unit 214 from the original resource.

In Step S10, the resource allocation unit 214 determines the resource to be allocated to the slice based on the device resource information 300 and unallocated resource information 304 managed by the resource information management unit 212 and the new slice request 303 managed by the slice management unit 213.

Specifically, first, as described above, after startup, in Step S2, the resource information management unit 212 receives the device resource information 300 acquired by the network information acquisition unit 211, and in Step S3, the resource information management unit 212 holds the resource information. The resource information at this time is, for example, the device resource information 300 shown in FIG. 4. Further, at this point, the unallocated resource information 304 is held as the same information as the device resource information 300.

Next, in Step S5, the new request allocation unit 2141 of the resource allocation unit 214 receives the new slice request 303, and in Step S7, determines, based on the unallocated resource information 304 held by the resource information management unit 212, whether or not the new slice request 303 can be satisfied if all the resources that can be allocated are allocated to the new slice request 303. When it is determined that the new slice request 303 can be satisfied, in Step S8, the resource allocation unit 214 transmits an allocation-is-possible notification 305 to the slice management unit 213. Then, in Step S10, the resource allocation unit 214 allocates a resource amount sufficiently satisfying the request to the new slice request 303. The processing up to this point is as described above.

Next, in Step S11, the resource allocation unit 214 transmits allocated resource information 306 indicating the resource allocated to the new slice request 303 to the resource information management unit 212 and the network control unit 215. In Step S12, the resource information management unit 212 updates the resource indicated by unallocated resource information 308, which is determined by excluding the resource allocated to the new slice request 303 by the new request allocation unit 2141 of the resource allocation unit 214 from the original device resource information 300 based on the allocated resource information 306. Then, in Step S13, the resource information management unit 212 transmits the unallocated resource information 308 to the resource allocation unit 214. This is described in detail below.

For example, as an example, there is described a case in which the new slice request 303 is the slice request R1 shown in FIG. 6. When the slice request R1 has been received, the higher-level host of the slice request R1 is the server #1, and the lower-level host is the slave station #1, and therefore the new request allocation unit 2141 of the resource allocation unit 214 selects, based on the device resource information 300 of FIG. 4, all the devices other than the server #2 and the slave station #2, that is, the server #1, the routers #1 to #3, the master station #1, the switches #1 and #2, and the slave station #1, as the devices connecting the server #1 and the slave station #1. Further, the new request allocation unit 2141 selects, based on the connection resource information 301 of FIG. 5, the links L1, L3 to L8, and L10 as links connecting those devices. Next, when all the bandwidths of all the selected devices and all the selected links have been allocated to the slice request R1 by the new request allocation unit 2141, there exists a route having the requested bandwidth of 1 Gbps or more of the slice request R1. Therefore, the new request allocation unit 2141 determines that the slice request R1 can be satisfied.

Actual examples of the bandwidth resource allocated to the slice request R1 and the unallocated bandwidth resource, which is unallocated resource information, are shown in FIG. 7 to FIG. 12. In the examples of FIG. 7 to FIG. 12, information on the device latency and the failure rate is omitted. In FIG. 7 and FIG. 8, there are shown the resource information and the connection information when all the bandwidths are allocated for, respectively, the bandwidths of all the devices and the links on all routes connecting the server #1 and the slave station #1. In FIG. 9 and FIG. 10, there are shown the resource information and the connection information when all the bandwidths are allocated for all the devices and the links on one route "server #1, router #1, router #3, master station #1, switch #1, switch #2, and slave station #1" connecting the server #1 and the slave station #1. In FIG. 11 and FIG. 12, there are shown the resource information and the connection information when bandwidths corresponding to the requested bandwidth amount are allocated for all the devices and the links on one route "server #1, router #1, router #3, master station #1, switch #1, switch #2, and slave station #1" connecting the server #1 and the slave station #1. It is not required to actually allocate all of the resource which can be allocated like in the examples of FIG. 9 and FIG. 10 and the examples of FIG. 11 and FIG. 12. However, a resource sufficient for the request is rapidly allocated without requiring a search for the required and sufficient amount of the resource to be allocated.

Next, when the resource allocation unit 214 receives the next new slice request 303, resource allocation processing satisfying the new slice request 303 is performed by the new request allocation unit 2141 in the same manner as in Step S6 to Step S13 described above based on the unallocated resource information 304 or the unallocated resource information 308 held by the resource information management unit 212.

Meanwhile, when the resource allocation unit 214 has not received the next new slice request 303, in Step S14, the existing request reallocation unit 2142 acquires an existing slice request 307 held by the slice management unit 213. Next, in Step S15, the existing request reallocation unit 2142 performs resource reallocation based on the existing slice request 307 and the unallocated resource information 308 held by the resource information management unit 212. At this time, the existing request reallocation unit 2142 performs resource reallocation so that the resource allocation is more efficient than the resource allocation by the new request allocation unit 2141.

In Step S16, the resource allocation unit 214 transmits reallocated resource information 309 indicating the reallocated resource to the resource information management unit 212 and the network control unit 215. Then, the resource allocation unit 214 waits for the next new slice request 303 to be received. In Step S17, the resource information management unit 212 updates unallocated resource information 310 in the same manner as in Step S12 described above even when the resource reallocation is performed. That is, the resource information management unit 212 updates the resource indicated by the unallocated resource information 310, which is determined by excluding the resource allocated to the existing slice request 307 by the existing request reallocation unit 2142 of the resource allocation unit 214 from the original device resource information 300 based on the reallocated resource information 309. In Step S18, the resource information management unit 212 transmits the unallocated resource information 310 to the resource allocation unit 214.

FIG. 13 and FIG. 14 are tables for showing examples of reallocated bandwidths and unallocated bandwidths. In FIG. 13, there is shown resource information, and in FIG. 14, there is shown connection information. In the examples of FIG. 13 and FIG. 14, reallocation is performed so that a maximum value of the unallocated bandwidth of a route increases.

In the examples of FIG. 7 and FIG. 8, of the two routes from the router #1 to the master station #1, that is, the routes of "router #1, router #2, master station #1" and "router #1, router #3, master station #1," both routes are selected. Further, all the bandwidths of the ports and the links of those two routes (port 3 and link 3 of router #1, port 1, port 2, and link 5 of router #2, port 1 of master station #1, port 4 and link 4 of router #1, port 1, port 2, and link 6 of router #3, and port 2 of master station #1) are allocated to the slice request R1. Therefore, both the routes from the router #1 to the master station #1 have an unallocated bandwidth of 0 Gbps. In this embodiment, the unallocated bandwidth of the route is the minimum bandwidth of the unallocated bandwidths of the ports and the links on the route.

In the examples of FIG. 9 and FIG. 10, of the two routes from the router #1 to the master station #1, that is, the routes of "router #1, router #2, master station #1" and "router #1, router #3, master station #1," the route of "router #1, router #3, master station #1" is selected. Further, all the bandwidths of the ports and the links of the route (port 4 and link 4 of router #1, port 1, port 2, and link 6 of router #3, and port 2 of master station #1) are allocated to the slice request R1. Therefore, the route of "router #1, router #3, master station #1" has an unallocated bandwidth of 0 Gbps. Meanwhile, the route of "router #1, router #2, master station #1" is not selected, and therefore the unallocated bandwidth of the route is 1 Gbps.

In the examples of FIG. 11 and FIG. 12, of the two routes from the router #1 to the master station #1, that is, the routes of "router #1, router #2, master station #1" and "router #1, router #3, master station #1," the route of "router #1, router #3, master station #1" is selected. Further, of the bandwidths of the ports and the links on the route (port 4 and link 4 of router #1, port 1, port 2, and link 6 of router #3, and port 2 of master station #1), the 1 Gbps requested by the slice request R1 is allocated to the slice request R1. Therefore, the route of "router #1, router #3, master station #1" has an unallocated bandwidth of 1 Gbps. Meanwhile, the route of "router #1, router #2, master station #1" is not selected, and therefore the unallocated bandwidth of the route is 1 Gbps.

Therefore, in the examples of FIG. 7 to FIG. 12, the two routes from the router #1 to the master station #1 both have an unallocated bandwidth of 1 Gbps or less. In contrast, in the examples of FIG. 13 and FIG. 14, reallocation is performed on the bandwidth of the route of "router #1, router #2, master station #1" to the slice request R1. That is, the bandwidth of the ports and links already allocated to the slice request R1 is released, and at the same time, of the bandwidths of the ports and the links on the route of "router #1, router #2, master station #1" (port 3 and link 3 of router #1, port 1, port 2, and link 5 of router #2, and port 1 of master station #1), the 1 Gbps requested by the slice request R1 is allocated to the slice request R1. Therefore, the unallocated bandwidth of the route of "router #1, router #2, master station #1" is 0 Gbps, and the unallocated bandwidth of the route of "router #1, router #3, master station #1" is 2 Gbps.

In fact, in the case of a slice request R2 shown in FIG. 6 as the next new slice request, after the reallocation shown in FIG. 13 and FIG. 14, the 1.5 Gbps requested bandwidth of the slice request R2 is satisfied by the bandwidth of the route of "router #1, router #3, master station #1." However, the requested bandwidth of 1.5 Gbps is not satisfied even before the reallocation examples shown in any of FIG. 7 to FIG. 12. In this way, the existing request reallocation unit 2142 performs resource reallocation so that there is more unallocated bandwidth and resource allocation is more efficient than the resource allocation by the new request allocation unit 2141.

Network Control

As described above, in Step S11 described above, the resource allocation unit 214 transmits the allocated resource information 306 for the new slice request 303 to the resource information management unit 212 and the network control unit 215. In response to this, in Step S19, the network control unit 215 generates slices by setting each device on the network based on the allocated resource information 306.

Further, in Step S16 described above, the resource allocation unit 214 transmits the reallocated resource information 309 for the existing slice request 307 to the resource information management unit 212 and the network control unit 215. In response to this, in Step S20, the network control unit 215 generates slices by setting each device on the network based on the reallocated resource information 309.

As the specific method of the network control unit 215 generating slices by setting each device on the network, any method may be employed, for example, use of a command input by remote login, OpenFlow, or a protocol like NETCONF/YANG.

As described above, in the resource allocation of allocating a resource to a slice request, the network controller 21 according to the first embodiment allocates a sufficient resource from among the unallocated resource to the new slice request 303, and performs resource reallocation to an existing slice request 307 so as to efficiently allocate as much of the resource as required. As a result, it is possible to improve the slice storage efficiency while accelerating resource allocation from the orchestrator 22 to a slice request.

In the above-mentioned example of a slice request, an example of a request for a bandwidth is described. However, in the case of a latency request, a comparison may be performed with the sum of the device latency of each device and the transmission latency of each link. In the case of an availability request, a comparison may be performed with an availability calculated from the failure rate of each device and each link. Other resource types are also applicable, as long as there is a calculation method that can be easily thought of by a person skilled in the art. Examples of such other resource types include a communication memory capacity, a frame loss rate, a fluctuation amount in transmission latency, and a fluctuation amount in a processing latency.

Further, in the operation example described above, allocation is performed to a new resource request, then reallocation is performed to the existing slice request, and after the reallocation, the network controller 21 waits for the next new resource request. However, the network controller 21 may be configured to receive a new resource request even during reallocation to the existing slice request.

Moreover, the new slice request may be a request to change the existing slice request. In that case, a resource released from an allocated resource for the request may be used as the unallocated resource.

The network controller 21 may further include a notification unit (not shown) configured to notify an amount of the unallocated resource to the outside. Further, the notification unit of the network controller 21 may notify the outside of information indicating how much the unallocated resource has decreased with respect to the original resource. Here, the outside refers to, for example, the orchestrator 22 or the network administrator.

The resource information management unit 212 may manage the resource for each route connecting devices which can be a higher-level host and a lower-level host. The devices which can be a higher-level host and a lower-level host can be specified by any method, for example, specifying the device based on the type of the device or setting the devices by the network administrator. In this case, the resource information management unit 212 aggregates pieces of resource information on the devices and the links on each route as route resource information. Examples of the resource information on each route include information on the bandwidth, latency, and availability of the route. As an example of the resource of each route, when the resource information is information on the bandwidth, the bandwidth may be the minimum bandwidth among the bandwidths of each device and each link on the route. When the resource information is information on the latency, the latency may be the sum of the latencies of each device and each link on the route. When the resource information is information on the availability, the availability may be a value obtained by subtracting the product of the failure rates of each device and each link on the route from "1". Other resource types are also applicable, as long as there is a calculation method that can be easily thought of by a person skilled in the art.

When there are a plurality of routes connecting a certain higher-level host and lower-level host, and it is possible to aggregate those plurality of routes due to the characteristics of each device on the network, in addition to each route, a route group which simultaneously uses a part or all of the plurality of routes can also be considered as one route connecting the higher-level host and the lower-level host.

In that case, as an example of an aggregate resource, in the case of the bandwidth, the bandwidth of each parallel portion of the routes is obtained as a sum, and the aggregate resource is the bandwidth which is the bottleneck of the entire route. In the case of a maximum latency among the latencies of the routes forming the routes, or in the case of the availability, when any of the parallel portions among the parallel portions of the route may be used, that route may be used as the aggregate resource.

Regarding the unallocated resource information, like in the example described above, a route resource obtained by excluding the allocated route resource allocated to the slice request by the resource allocation unit 214 from the original route resource may be used as the unallocated route resource information.

When the resource management by the resource information management unit 212 is performed for each route, the resource allocation unit 214 determines the route resource to be allocated to the slice based on the route resource information and the unallocated route resource information managed by the resource information management unit 212 and the slice information managed by the slice management unit 213. Like in the case of the slice request, the resource information is information on each route, and therefore the processing load required to determine whether or not it is possible to allocate the resource satisfying the request and to select the route to be actually allocated is reduced.

In particular, the resource information management unit 212 manages the route resource so that the route resource is arranged in order from the most unallocated route resource, and the resource allocation unit 214 determines whether or not it is possible to allocate the resource satisfying the request by performing a comparison from the most unallocated route resource. As a result, it is possible to immediately determine whether or not allocation is possible.

Second Embodiment

Figure 15:
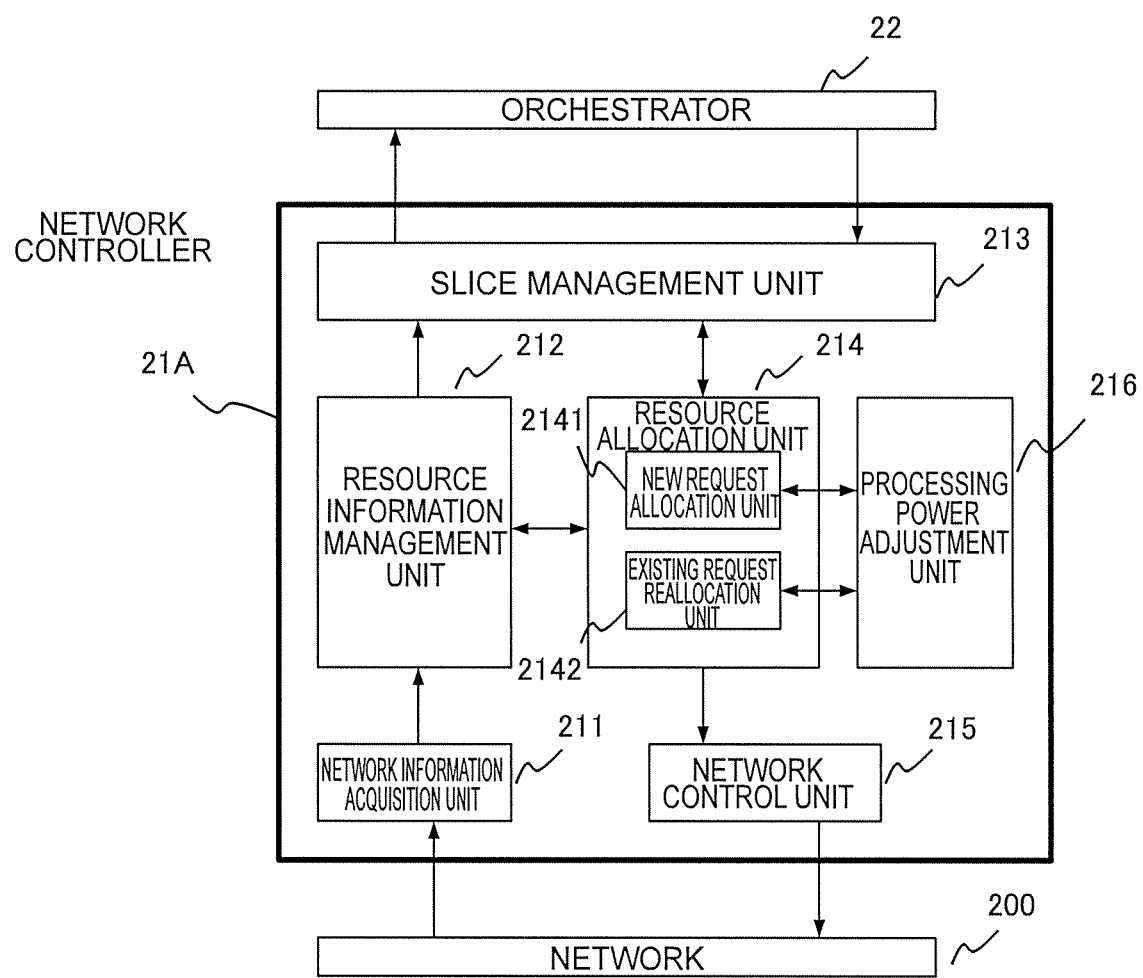
FIG. 15 is a block diagram for illustrating a configuration of a network controller included in a communication system in a second embodiment of the present invention.

FIG. 15 is a block diagram for illustrating a configuration of a network controller 21A according to a second embodiment of the present invention. The network controller 21A according to the second embodiment further includes a processing power adjustment unit 216 in addition to the configuration of the network controller 21 according to the first embodiment.

The operation of each component other than the processing power adjustment unit 216 is the same as that of FIG. 2 of the first embodiment described above, and therefore those components are denoted by the same reference numerals and description thereof is omitted here.

Further, the configuration of the overall communication system in the second embodiment is the same as that of FIG. 1 in the first embodiment described above, and therefore description thereof is omitted here.

Processing Power Adjustment

The processing power adjustment unit 216 is configured to determine an allocation of a processing power to each of the new request allocation unit 2141 and the existing request reallocation unit 2142 of the resource allocation unit 214. Specifically, the processing power adjustment unit 216 monitors a processing load state of the new request allocation unit 2141 and a processing load state of the existing request reallocation unit 2142. The processing power adjustment unit 216 determines the allocation of the processing power to each of the new request allocation unit 2141 and the existing request reallocation unit 2142 based on those processing load states. Further, the processing power adjustment unit 216 monitors an actual value of the time required for one allocation operation between the new request allocation unit 2141 and the existing request reallocation unit 2142. When there is a time requirement for the time required for the allocation operation, the processing power adjustment unit 216 calculates a request value of the time satisfying the time requirement. The processing power adjustment unit 216 compares the actual value with the request value, and determines the allocation of the processing power. As described above, the processing power adjustment unit 216 is configured to change, based on the processing load state of new request allocation processing and existing request reallocation processing and the time requirement for the new request allocation processing and the existing request reallocation processing, the allocation of the processing power of new request allocation by the new request allocation unit 2141 and the processing power of existing request reallocation by the existing request reallocation unit 2142.

As a specific method of monitoring the processing loads and changing the allocation of the processing power, for example, there is a method of operating the new request allocation unit 2141 and the existing request reallocation unit 2142 on different virtual machines. The request value for the time required for the allocation operation is set by, for example, the network administrator, which is included in the slice request.

As described above, in the network controller 21A according to the second embodiment, the processing power adjustment unit 216 adjusts the processing power of the new request allocation unit 2141 and the processing power of the existing request reallocation unit 2142 of the resource allocation unit 214 based on the operating conditions and the time requirements of each of those units. As a result, it is possible to achieve a good balance between the speed of resource allocation to a new slice request and the efficiency of resource allocation to an existing slice request.

It is not required that each function of the network controller 21 according to the first embodiment described above and the network controller 21A according to the second embodiment described above be included in a single device.

The features of the network controller according to the first and second embodiments described above can be summarized as follows.

(1) When a new slice request is received, an unallocated surplus resource is allocated. As a result, rapid slice generation can be implemented.

(2) When allocation of the surplus resource is repeated, the network resource soon run out. Therefore, in addition to the allocation of the feature (1), an efficient resource allocation including accumulated slice requests is separately performed. As a result, by reallocating the resource as appropriate, highly efficient slice storage becomes possible.

That is, the network controller according to the first and second embodiments can achieve both rapid slice generation and efficient slice storage. There is a certain interval between receiving the slice requests, and during that interval, the efficient resource allocation of the feature (2) can be executed.

Figure 16:
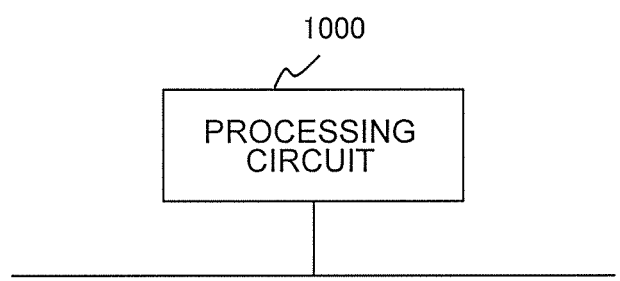
FIG. 16 is a block diagram for illustrating a hardware configuration of the network controller included in the communication system in the first embodiment and the second embodiment of the present invention.
Figure 17:
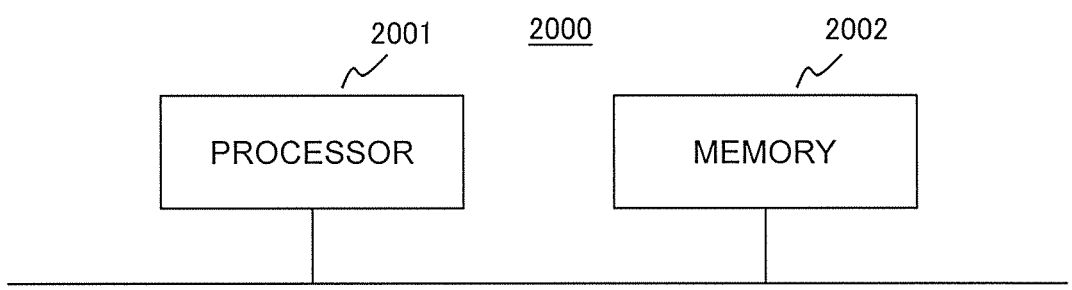
FIG. 17 is a block diagram for illustrating a hardware configuration of the network controller included in the communication system in the first embodiment and the second embodiment of the present invention.

Each of the functions of the network controller 21 according to the first embodiment described above and the network controller 21A according to the second embodiment described above is implemented by a processing circuit. The processing circuit for implementing each of the functions may be dedicated hardware, or a processor configured to execute a program stored in a memory. FIG. 16 is a configuration diagram for illustrating a case in which each function of the network controller 21 according to the first embodiment described above and the network controller 21A according to the second embodiment described above is implemented by a processing circuit 1000 which is dedicated hardware. FIG. 17 is a configuration diagram for illustrating a case in which each function of the network controller 21 according to the first embodiment described above and the network controller 21A according to the second embodiment described above is implemented by a processing circuit 2000 including a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof. The functions of the respective units may each be implemented by the individual processing circuit 1000, or may be implemented together by one processing circuit 1000.

Meanwhile, when the processing circuit is the processor 2001, the functions of the respective units are implemented by software, firmware, or a combination of software and firmware. The software and the firmware are coded as a program and stored in the memory 2002. The processor 2001 reads and executes the program stored in the memory 2002, to thereby implement the function of each of the units.

It is also understood that those programs cause a computer to execute the steps and methods described above for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisk, or a DVD.

Some of the functions of the respective units described above may be implemented by dedicated hardware, and others thereof may be implemented by software or firmware.

In this manner, the processing circuit can implement the function of each of the units described above by hardware, software, firmware, or a combination thereof.

REFERENCE SIGNS LIST 1 resource layer, 2 control layer, 3 application layer, 10 wireless network, 11 wireless access network, 12 transport network, 13 core network, 14 master station, 15 slave station, 20 terminal controller, 21 network controller, 22 orchestrator, 30 application, 100 terminal, 110 switch, 120 server, 121 routers, 130 router, 131 core server, 200 network, 211 network information acquisition unit, 212 resource information management unit, 213 slice management unit, 214 resource allocation unit, 215 network control unit, 2141 new request allocation unit, 2142 existing request reallocation unit

The invention claimed is:

1. A network controller, comprising:
network information acquisition circuitry configured to acquire resource information indicating a resource possessed by each of devices on a network and connection information indicating connections between the devices on the network;
slice management circuitry configured to receive a slice request requesting resource allocation, manage the received slice request as a new slice request, and to manage an existing slice request as an existing slice request;
resource information management circuitry configured to manage the resource information acquired by the network information acquisition circuitry, and to manage unallocated resource information indicating an unallocated resource determined by excluding an allocated resource from the resource of the resource information;
resource allocation circuitry configured to determine, based on the resource information and the unallocated resource information managed by the resource information management circuitry, a resource to be allocated to the new slice request and the existing slice request managed by the slice management circuitry; and
network control circuitry configured to set each of the devices on the network based on the resource allocation determined by the resource allocation circuitry,
the resource allocation circuitry including:
new request allocation circuitry configured to perform, to the new slice request, allocation of a resource having a sufficient amount for the new slice request from a resource of the unallocated resource information managed by the resource information management circuitry; and
existing request reallocation circuitry configured to reallocate a resource having at least an amount required for the existing slice request to the existing slice request so that the unallocated resource increases based on the unallocated resource information managed by the resource information management circuitry,
wherein, when performing initial allocation of a resource, the new request allocation circuitry is configured to perform, to the new slice request, allocation of a resource having a sufficient amount for the new slice request, the sufficient amount being set as a value equal to or larger than an amount required and sufficient for the new slice request, and wherein, when reallocating a resource to the existing slice request, the existing request reallocation circuitry is configured to perform allocation of a resource having at least an amount required for the existing slice request, the amount being set as a value smaller than an amount sufficient for the existing slice request.

2. The network controller according to claim 1,
wherein the resource information includes information on a latency of each of the devices, a failure rate of each of the devices, and a bandwidth of each of ports possessed by each of the devices, and
wherein the connection information includes information on a connection relationship between the ports of each of the devices, a transmission latency between the ports, and the bandwidth between the ports.

3. The network controller according to claim 1,
wherein the resource information management circuitry is configured to manage the resource information for each route connecting devices which are an endpoint of a slice, and
wherein the resource information on each route includes a latency, a bandwidth, and an availability of the route.

4. The network controller according to claim 2,
wherein the resource information management circuitry is configured to manage the resource information for each route connecting devices which are an endpoint of a slice, and
wherein the resource information on each route includes a latency, a bandwidth, and an availability of the route.

5. The network controller according to claim 1, further comprising notification circuitry configured to notify an amount of the unallocated resource to outside.

6. The network controller according to claim 2, further comprising notification circuitry configured to notify an amount of the unallocated resource to outside.

7. The network controller according to claim 3, further comprising notification circuitry configured to notify an amount of the unallocated resource to outside.

8. The network controller according to claim 4, further comprising notification circuitry configured to notify an amount of the unallocated resource to outside.

9. The network controller according to claim 1, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

10. The network controller according to claim 2, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

11. The network controller according to claim 3, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

12. The network controller according to claim 4, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

13. The network controller according to claim 5, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

14. The network controller according to claim 6, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

15. The network controller according to claim 7, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

16. The network controller according to claim 8, further comprising processing power adjustment circuitry configured to change, based on a processing load state of new request allocation processing and existing request reallocation processing and a time requirement for the new request allocation processing and the existing request reallocation processing, allocation of a processing power of new request allocation by the new request allocation circuitry and a processing power of existing request reallocation by the existing request reallocation circuitry.

* * * * *